F. P. Pflegar.
Lock and Latch.
Nº 87,510. Patented Mar. 2, 1869.
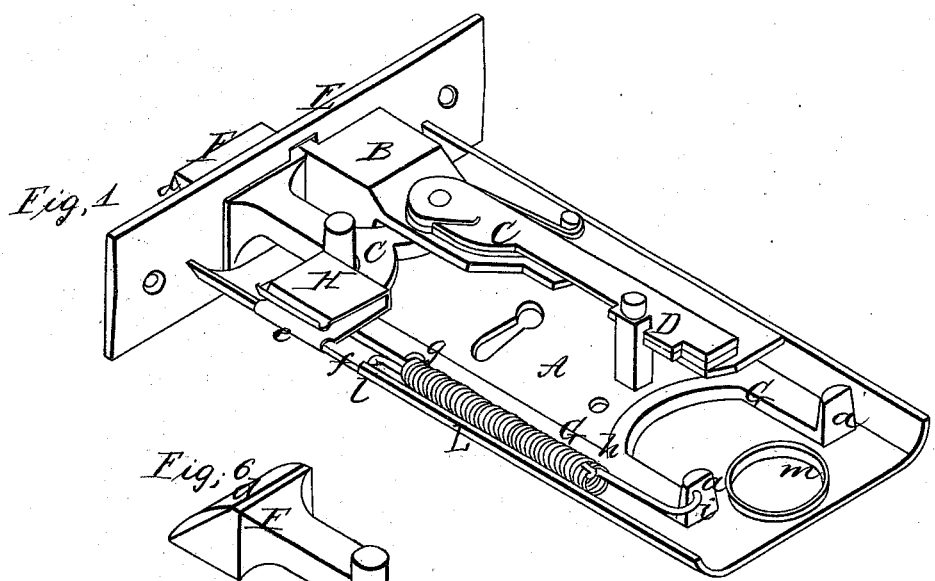
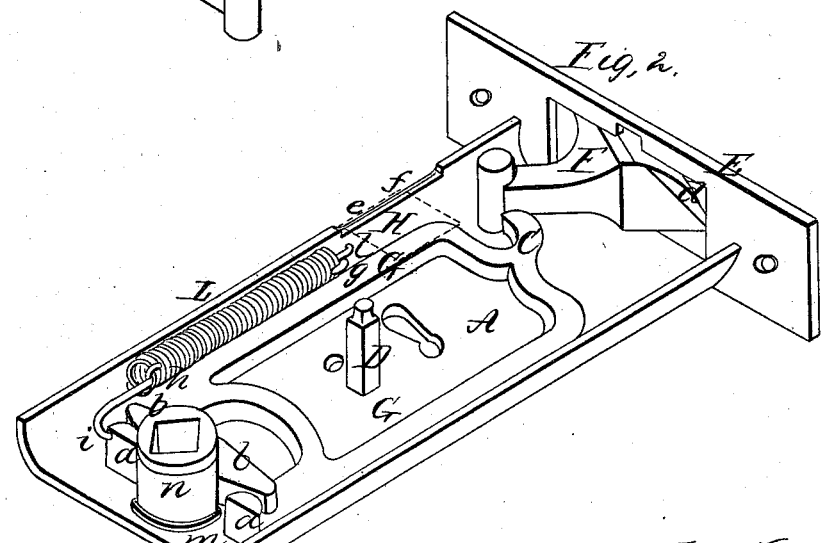
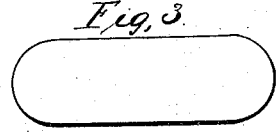 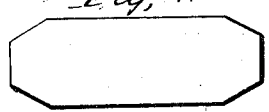 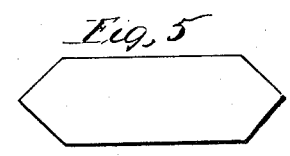
Witnesses
Richard P. Lyon.
R. Fitzgerald.
Inventor,
F. P. Pflegar.

FRANK P. PFLEGHAR, OF NEW HAVEN, CONNECTICUT.

Letters Patent No. 87,510, dated March 2, 1869.

IMPROVEMENT IN REVERSIBLE KNOB-LATCHES.

The Schedule referred to in these Letters Patent and making part of the same.

*To all whom it may concern:*

Be it known that I, FRANK P. PFLEGHAR, of the city and county of New Haven, in the State of Connecticut, have invented a new and useful Improvement in Door-Lock and Latch; and I do hereby declare that the following is a full, clear, and exact description of the construction, character, and operation of the same, reference being had to the accompanying drawings, which make part of this specification, in which—

Figure 1 is a perspective view of the whole apparatus, with one side of the case removed.

Figure 2 is a perspective view of the "horse-shoe," or the sliding frame, to which the latch, or spring-bolt, is attached, the spiral spring which works it, and the reversible spring-bolt.

Figures 3, 4, and 5, are plans of the case, in cross-section.

Figure 6 is a perspective view of the reversible latch, when detached from the horse-shoe slide.

My invention consists in making the spiral spring, which carries the "horse-shoe," slide forward, to force the latch, or spring, out, to fasten the door, with two rods, or wires, passing through it, each hooked at one end, and the forward end of one secured to the case, and the rear end of the other secured to the rear end of one part of the "horse-shoe," so that, when the "horse-shoe" and bolt are forced back by the knob and spindle, to open the door, the two hooks will cause a contraction or condensation of the spring, so that it will expand, when released, and throw the "horse-shoe," and consequently the latch, forward.

I make the case of heavy sheet-iron, or any other suitable material, substantially in the form indicated by the longitudinal half shown at A, figs. 1 and 2, which will appear, in its cross-section, like fig. 3, or I may shape it so that its cross-section will appear as represented in figs. 4 or 5, and so that it may be about three times as broad as it is thick; and I make the holes in the two sides of the case (in which the socket, or follower n, of the spindle, works,) by punching it in such a manner as to raise and form a substantial collar entirely around it, on the inner side, as represented at m, fig. 1, and indicated at m, fig. 2, which will very materially strengthen the case, especially when made of thin metal, and will cause the socket n, with the spindle, to work more steadily.

I make the lock-bolt, or that which is moved by the key, in the usual form, as represented at B, fig. 1, with one or more tumblers, as represented at C, fig. 1, so as to be secured in either the locked or unlocked position, by a suitable stud, fitting the notches in the tumblers, as represented at D, figs. 1 and 2; and I have the bolt slide through the plate E, directly in contact with the latch, or spring-bolt F, figs. 1, 2, and 6.

I make the spring-bolt, or latch F, of cast brass, or any other suitable material, substantially in the form shown in fig. 6, and indicated at F, in figs. 1 and 2, and I make it suitable to be reversed, so that the lock and latch may be used for either a right or a left-hand door, as its form clearly demonstrates.

I make the slide, or horse-shoe, of cast brass, or any other suitable material, substantially in the form shown at G G, figs. 1 and 2, with the usual projections, or calks, as *a a*, against which the horns *b b* are pressed, by turning the knob and spindle to force the latch back, to open the door; and, on its front end, I form a hook, as shown at *c*, fig. 2, and indicated at *c*, fig. 1, wherein the rear or inner end of the reversible latch F is to be secured, either side foremost, for use.

To secure this reversible latch F in the hook *c*, I fit a spring-slide, or binder, H, fig. 1, which I make by doubling a suitable piece of sheet-metal, and bending its edges, so as to form a V-shaped groove on each side, as shown at *e*, fig. 1, to fit the edges of the case when cut away, as represented at *f*, fig. 2, so that it may slide forward to the position shown at H, in fig. 1, to firmly secure the reversible latch F in its proper position for use; or it may be slipped back to the position shown in dotted lines at H, fig. 2, to release the rear end of the latch F, as indicated in fig. 2, when I desire to reverse it, which may thus be done at any time, without opening the case.

I make the spiral spring L of brass, or any other suitable wire, wound in the usual way, but I suspend it longitudinally, on two rods or wires, as shown in figs. 1 and 2.

At one end of each of these rods I form a suitable hook, as represented at *g* and *h*, which hooks around or over the outer or end coil of the wire, while the other end of one of the rods, as that opposite *g*, hooks into one of the projections or calks of the horse-shoe, as indicated at *i*, figs. 1 and 2, and the other, that opposite *h*, I secure in a hole in the case, as shown at *l*, all as represented in figs. 1 and 2, so that when the "horse-shoe" G G is drawn back, by revolving the knob and spindle, to unlatch the door, the two rods, by means of their hooks *g* and *h*, will contract the spiral spring, and when released, the reaction of the spring will draw the rods, by means of their hooks *g* and *h*, so as to lap along each other, as before, thus rendering the spring much more effective and durable than it could be without the rods. Should the spring break in several places, it would but slightly weaken it.

Having made the several parts, and arranged them as before described and represented in fig. 1, I put in the socket, or follower *n*, with its horns *b b*, fig. 2, and then put on the other half of the case, and secure it with a proper screw, when the whole will be ready for use; but if I find the bevelled side *d* of the latch F is placed the wrong way to suit the door, I move the spring-slide H from the position shown in fig. 1 to that indicated by dotted lines at H, fig. 2, when I can withdraw the latch F, turn it over, and reinsert it, all of which operation is indicated in fig. 2. I then move the spring-slide H to the position shown in fig. 1, when the whole will be ready to be inserted into the mortise in the stile of the door.

This change can be made in a very few seconds, and yet the latch will be perfectly and firmly secured by the slide H, when in the notch c, fig. 2.

I am aware that a reversible latch is not new, and that a cylindrical case was patented by William A. Ives, in 1856, and that cases, with curved edges, are not new. I, therefore, do not claim either of these, as such, as my invention; but

What I claim as my invention, and desire to secure by Letters Patent, is—

The combination of the spiral spring L and its rods $g\ i$ and $h\ l$, with the horse-shoe and slide G G, when constructed and fitted for use, substantially as herein described.

F. P. PFLEGHAR.

Witnesses:
RICHARD F. LYON,
R. FITZGERALD.